Sept. 15, 1964     W. B. ROBBINS ETAL     3,148,820
MERCHANDISE PACKAGE
Filed June 7, 1962            2 Sheets—Sheet 2
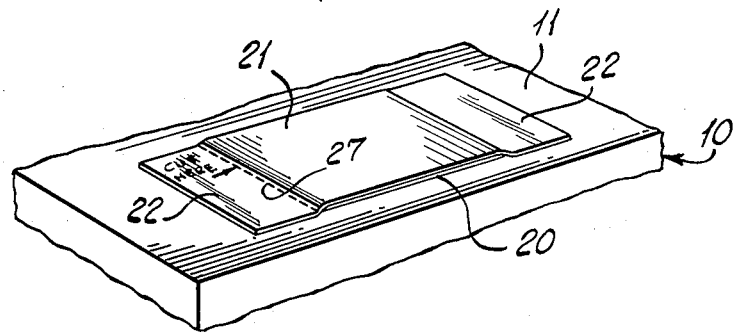
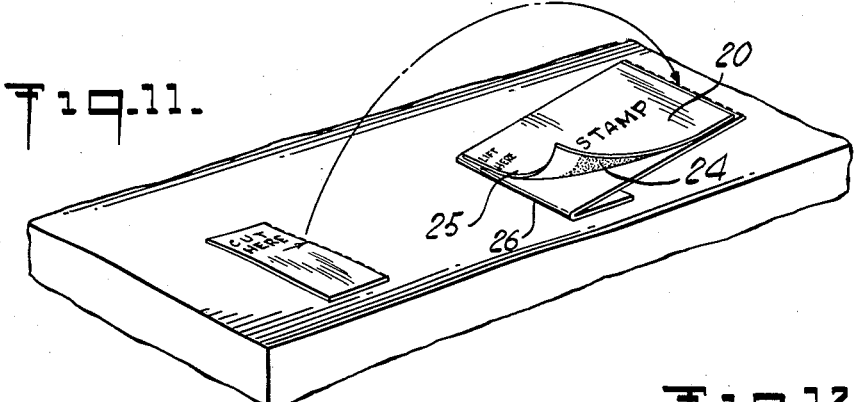
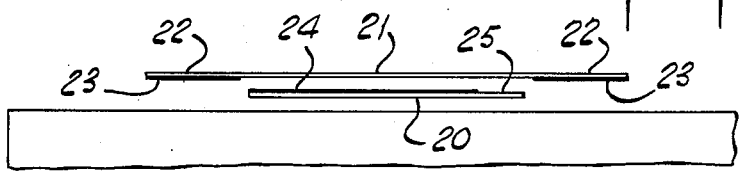
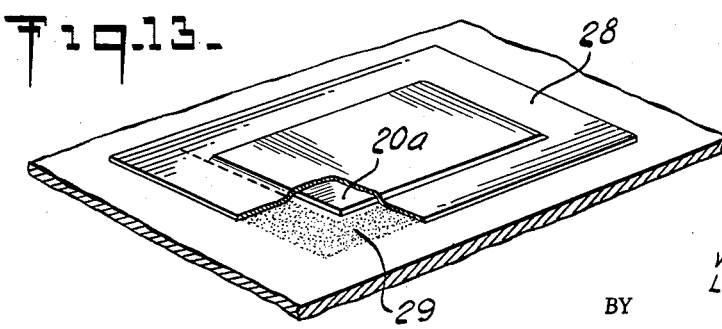
INVENTORS
WILLIAM B. ROBBINS
LOUIS GREENWOOD
BY Burgess, Ryan, & Hicks
ATTORNEYS 3,148,820
MERCHANDISE PACKAGE
William B. Robbins, Darien, Conn., and Lewis Greenwood, Scarsdale, N.Y., assignors to Young & Rubicam, Inc., New York, N.Y., a corporation of New York
Filed June 7, 1962, Ser. No. 202,641
14 Claims. (Cl. 229—37)

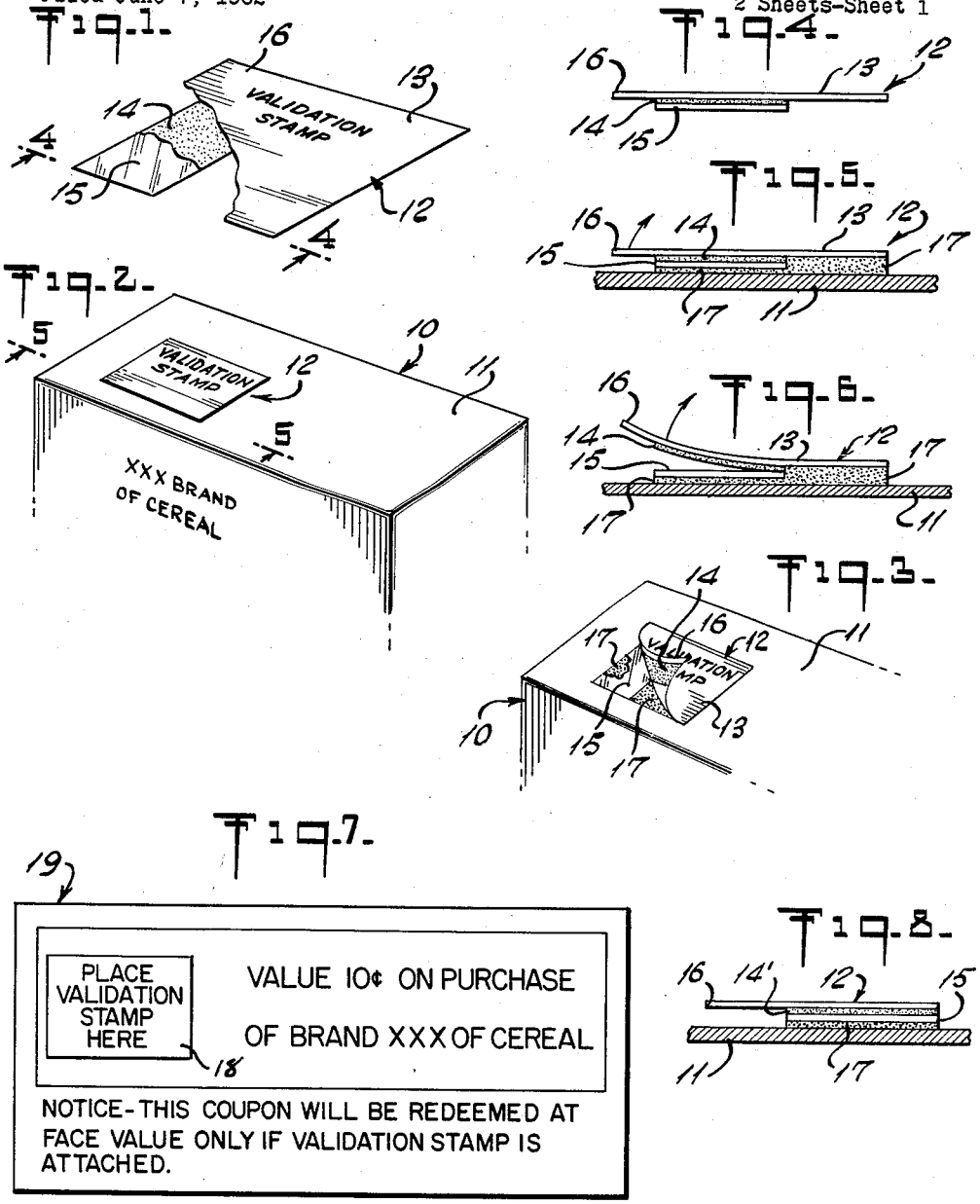

The present invention relates to improvements in merchandise packages. It relates, more particularly, to a merchandise package which incorporates means for validating redeemable coupons with proof of purchase of the merchandise for which the coupons are issued and a system of using such a package.

This application is a continuation-in-part of our application for United States Letters Patent, Serial Number 125,830, filed July 21, 1961, now abandoned.

An object of the present invention is to provide a merchandise package which will enable a storekeeper to furnish a manufacturer or distributor with proof with the merchandise or item called for by a redeemable coupon has been sold to a customer when the coupon is presented for redemption. Such coupons are frequently used in introducing new items or in promoting the sale of items already on the market. When presented to the storekeeper by a customer at the time the purchase of the item specified on the coupon is made, such coupons authorize the storekeeper to deduct the face value of the coupon from the price of the specified item. The storekeeper in turn presents the coupons received from his customers, to the manufacturer or distributor for redemption. Such coupons are usually distributed by direct mail or in publications such as newspapers or magazines and because they have a monetary value when presented to the manufacturer or distributor for redemption, their use has been subject to certain abuses which are costly and expensive to manufacturers or distributors issuing the coupons. For example, coupons may be submitted for redemption without the purchase of the specified item actually having been made and the manufacturer has no ready way of determining this. Further, counterfeit coupons have, on occasion, been presented for redemption.

The present invention is directed to overcoming these problems in connection with the promotion of merchandise through the use of redeemable coupons by providing the manufacturer with proof that the item called for was sold in conjunction with each coupon presented for redemption. By furnishing such proof, the present invention negatives to a large extent any benefits which might be derived through redeeming coupons where the item called for was not sold or from the use of counterfeit coupons.

A further object of the present invention is to provide a package which incorporates means for validating redeemable coupons without imposing an undue burden on the storekeeper and which can be incorporated in the merchandise package at low cost.

Other objects and advantages of the invention will be more fully described and better understood from the following description and the accompanying drawing, in which:

FIG. 1 is a perspective view, partially broken away and on an enlarged scale, showing a validation stamp for use in a merchandise package embodying the invention;

FIG. 2 is a perspective view of a portion of a merchandise package embodying the invention;

FIG. 3 is a perspective view of a part of the package shown in FIG. 2 showing the validation stamp being removed therefrom;

FIG. 4 is a section view taken along the line 4—4 of FIG. 1;

FIG. 5 is a section view taken along the line 5—5 of FIG. 2;

FIG. 6 is a view corresponding to FIG. 5 showing the validation stamp being removed therefrom;

FIG. 7 is a face view of a coupon to which theh validating stamp from the package shown in FIG. 1 is to be applied;

FIG. 8 is a fragmentary view in vertical section of a modified package embodying the invention;

FIG. 9 is a fragmentary view in vertical section of another modified package embodying the invention;

FIG. 10 is a perspective view illustrating a modified form of a merchandising package and coupon validating stamp embodying the invention;

FIG. 11 is a perspective view illustrating removal from the package of the coupon validating stamp shown in FIG. 10;

FIG. 12 is an exploded front elevational view of the package and stamp illustrated in FIG. 10; and FIG. 13 is a perspective view of a portion of another form of package and coupon validating stamp embodying the invention.

Referring now to the drawing in detail, there is a package 10 which includes a container 11 for the merchandise being sold. The container may be of any desired construction, such as a cardboard box, a metal can or an outer wrapping of paper or the like.

The package also includes a validation stamp 12 which is removably affixed to an exposed surface of the container. As is shown best in FIGS. 1 and 4, the validation stamp comprises a top layer or sheet 13 of paper or other suitable material which has a coating 14 of a pressure sensitive adhesive applied to a portion of the lower surface thereof. Such pressure sensitive adhesives are well known and need not be described in detail here.

In the form illustrated, the pressure sensitive adhesive coating is spaced from the side edges of the top sheet so as to leave areas along the front and rear edges of the top sheet which are free of the adhesive. A protective release strip 15 having a treated surface contacting with the pressure sensitive adhesive coating on the lower surface of the top sheet extends over the adhesive coating and is removably held thereto by the coating. The release strip may be a strip of paper having the surface contacting with the pressure sensitive adhesive coating waxed or otherwise treated so that it will separate from the adhesive coating under a slight pull without affecting the adhesive character of the coating.

As noted above, the pressure sensitive adhesive coating is spaced inwardly from the front edges of the top sheet and thus, an uncoated lip or tab 16 extends along the front edges of the stamp which can be readily grasped for the removal of the top sheet from the container. The release strip is secured to the surface of the container by a layer 17 of glue which holds the release strip in place when the top sheet is removed from the container with the result that the pressure sensitive adhesive coating on the lower surface of the sheet is exposed.

The layer of glue or cement may also contact with the uncoated lower surface of the top sheet extending along the rear edge thereof, as is shown best in FIGS. 5 and 6. In such a case, residue from the glue may be exposed on the surface of the container when the top sheet is removed or the surface of the container may be slightly torn in this area by removal of the glue with the top sheet. In either case, the surface of the container will be defaced in such a way as to provide an indication that the validation stamp has been removed therefrom. In order to insure that the protective strip remains on the container and the pressure sensitive adhesive coating on the top sheet is exposed when the stamp is removed from the container, the layer of glue should adhere to the release strip with greater force or adhesion than the force with which the pressure sensitive adhesive coating adheres to the treated surface of the release strip. In this connection, it should be noted that adhesion of the glue to the bottom surface of the release strip may be increased if such surface is not treated.

The top sheet which forms the validation stamp can be readily removed from the container by lifting the uncoated tab at the front edge thereof and then peeling the pressure sensitive adhesive coating from the release strip which is held to the top of the container by the layer of glue. As mentioned above, the area at the rear edge of the top sheet which is contacted by the glue or cement may carry the glue and possibly part of the surface of the container with it or it may also separate from the glue. This will depend on the characteristics of the glue and the materials from which the container and the top sheet of the stamp are made. Regardless of this, the release strip remains on the surface of the container and will serve as a notice that the validation stamp has been removed so as to deter customers from purchasing such packages. If desired, the release strip can carry printing for this purpose.

After removal from the container, the validation stamp can be readily attached to an appropriate space 18 on the face of a redemption coupon 19 such as shown in FIG. 7, by bringing the pressure sensitive adhesive coating in contact therewith. This can be done quickly with very little effort or trouble on the part of the storekeeper. Affixing of the validation stamp to the coupon in this manner provides the manufacturer or distributor with proof that the particular item for which the coupon was issued was sold by the storekeeper presenting the coupon. Such proof will make the use of redeemable coupons a more effective and efficient way of promoting the sale of merchandise.

A modified form of package embodying the invention is shown in FIG. 8. In this embodiment, a coating 14' of a pressure sensitive adhesive extends to the rear edge of the top sheet and the layer of glue 17 which secures the stamp to the container contacts with the bottom surface of the release strip. Here again, when the lift tab 16 is raised to remove the stamp from the container, the release strip is separated from the pressure sensitive adhesive coating and remains on the surface of the container.

A further modification of the invention is shown in FIG. 9 and in this embodiment a coating 14" of pressure sensitive adhesive also extends to the rear edge of the top sheet. However, the layer of glue 17 contacts with the bottom surface of the top sheet between the lift tab and the pressure sensitive adhesive coating and with the release strip which covers the pressure sensitive adhesive coating. In this embodiment, the portions of the top sheet and the container which are glued together must be disengaged prior to separation of the pressure sensitive adhesive coating from the release strip.

The embodiment of the invention illustrated in FIGS. 10–12 comprises a coupon validating stamp 20 which is removably secured to the container by means of a protective strip 21. The protective strip has end portions 22 which extend beyond the stamp and the end portions of the strip are secured to the surface of the container by a suitable adhesive 23. The adhesive securing the ends of the strip to the container may be a heat activatable adhesive, such as a thermoplastic resin of which various types are available commercially and which will hold the ends of the strip to the surface of the container with a high degree of adherence upon the application of heat thereto. Such an adhesive is non-tacky when dry and hence, lends itself to the manufacture of the strip and stamp as a unit prior to application to the container. However, it will be understood that other types of adhesives, such as cements or glues, may be used to secure the ends of the strip to the container if desired.

In this form, the coupon validating stamp which is located beneath the center of the strip is inverted with its printed surface facing downwardly. A coating 24 of a pressure sensitive adhesive is applied to an area of the upwardly facing surface of the strip and releasably engages with the opposing surface of the strip. Easy release of the pressure sensitive adhesive coating from engagement with the surface of the strip may be obtained by treating the surface of the strip with wax or the like and the adhesive will remain on the stamp. The strip may be made of a plastic or similar material with which the adhesive will releasably engage.

An uncoated area 25 extending along one end of the upper surface of the stamp provides a flap or tab which can be grasped and lifted without difficulty for removal of the stamp from the strip. The lifting flap is preferably positioned adjacent a line 26 where one of the ends of the strip is secured to the container. Thus, when the strip has been cut and folded back on itself, as shown in FIG. 11, the flap will be exposed adjacent the uncut end of the strip which is held to the container.

Appropriate markings or perforations 27 may be provided at the end of the strip which is to be cut. In order to remove the stamp from the container, the protective strip must be cut and this makes unauthorized removal or pilfering of the stamp more difficult and easier to detect.

To make unauthorized removal of the stamp even more difficult, a protective strip 28 having portions extending beyond a coupon validating stamp 20a on all side thereof, as shown in FIG. 13, may be employed. In this form, the portions of the strip extending beyond the stamp are secured to the container by a suitable adhesive 29, which may be heat activatable as previously described. To remove the stamp, the strip is cut along two sides and at least one end of the stamp. In this form, the stamp will be completely enclosed beneath the strip and protected from moisture or other damage. In addition, the stamp need not be attached to the strip and a moisture activatable adhesive may be used on the stamp if desired.

The printing on the stamps may be in magnetic ink or the like so that when the stamps are attached to redeemed coupons, they will provide marketing data and accounting information which can be picked up by computing equipment.

It will be understood that other modifications and changes may be made by those skilled in the art in the various embodiments of the invention which have been illustrated and described herein without departing from the scope or spirit of the invention as defined by the following claims.

We claim:

1. In a merchandise package, the combination which comprises:
   (a) a container,
   (b) a coupon validating stamp removably secured to a surface of the container,
   (c) said stamp comprising a sheet of flexible material and a coating of a pressure sensitive adhesive carried on one surface of said sheet,
   (d) a protective release strip having a surface opposing the coated surface and releasably engaging with the adhesive coating thereon,
   (e) said stamp being removable from the strip with the pressure sensitive adhesive coating remaining on the stamp upon removal of the stamp from the strip, and
   (f) adhesive means securing the release strip to the container.

2. In a merchandise package, the combination as defined in claim 1 wherein:
   (a) the stamp has an uncoated surface area adjoining the pressure sensitive adhesive coating, (b) said uncoated surface area forming a tab for manual engagement in removing the stamp from the release strip.

3. In a merchandise package, the combination as defined in claim 1 wherein:
(a) the adhesive means securing the release strip to the container also engages with a portion of the stamp and secures said portion of the stamp to the container.

4. In a merchandise package, the combination as defined in claim 1 wherein:
(a) the protective release strip includes portions extending beyond the stamp at opposite ends thereof and
(b) the adhesive means securing the release strip to the container engages with the portions of the strip extending beyond the stamp.

5. In a package for the sale of merchandise in conjunction with a redeemable coupon, the improvement which comprises:
(a) a container,
(b) a coupon validating stamp removably affixed to a surface of the container,
(c) said stamp comprising a sheet of flexible material and
(d) a coating of a pressure sensitive adhesive applied to a portion of one surface of said sheet,
(e) a release srtip having a surface facing and contacting with the adhesive coating on the stamp,
(f) said strip being releasable from contact with the adhesive coating on the stamp and
(g) an adhesive securing the release strip to the surface of the container with greater adhesive force than the adhesive force acting between the pressure sensitive adhesive coating on the stamp and the release strip.

6. In a package for the sale of merchandise in conjunction with a redeemable coupon, the improvement as defined in claim 5 wherein:
(a) the stamp has an uncoated area on the surface facing the release strip,
(b) said uncoated area forming a lift tab for manual engagement in removal of the stamp from the release strip.

7. In a package for the sale of merchandise in conjunction with a redeemable coupon, the improvement as defined in claim 5 wherein:
(a) the surface of the stamp with the pressure sensitive adhesive coating faces upwardly,
(b) the release strip has portions extending beyond the stamp at opposite ends thereof and
(c) the adhesive securing the release strip to the container engages with the portions of the strip extending beyond the stamp.

8. In a package for the sale of merchandise in conjunction with a redeemable coupon, the improvement as defined in claim 7 wherein:
(a) a portion of the surface of the stamp facing the release strip is free of adhesive and forms a tab for manual engagement in removal of the stamp from the release strip.

9. In a package for the sale of merchandise in conjunction with a redeemable coupon, the improvement as defined in claim 7 wherein:
(a) the adhesive securing the release strip to the surface of the container is heat activatable.

10. In a package for the sale of merchandise in conjunction with a redeemable coupon, the improvement which comprises:
(a) a container,
(b) a coupon validating stamp removably secured to the container,
(c) said stamp comprising a sheet of flexible material and (d) a coating of an adhesive material carried on one surface of the stamp,
(e) said adhesive material being activatable for affixing the stamp to a redemption coupon upon removal of the stamp from the container,
(f) a strip of material engaging with and removably securing the stamp to the container and
(g) an adhesive engaging with said strip and securing the strip to the container.

11. In a package for the sale of merchandise in conjunction with a redeemable coupon, the improvement as defined in claim 10 wherein:
(a) the strip has portions extending beyond the stamp and
(b) the adhesive holding the strip to the container engages with the portions of the strip extending beyond the stamp.

12. In a package which includes a container for the sale of merchandise in conjunction with a redeemable coupon, the improvement which comprises
(a) a coupon validating stamp removably attached to a container,
(b) said stamp comprising a sheet of flexible material and
(c) a coating of a pressure sensitive adhesive material carried on one surface of the stamp,
(d) a release strip having a surface opposing the pressure sensitive adhesive coating on the stamp and releasably engaging therewith, and
(e) an adhesive material securing the release strip to the container,
(f) said adhesive material securing the release strip to the surface of the container with greater adhesive force than the adhesive force exerted by the pressure sensitive adhesive coating on the release strip.

13. In a package which includes a container for the sale of merchandise in conjunction with a redeemable coupon, the improvement as defined in claim 12 wherein:
(a) the pressure sensitive adhesive coating is on a surface of the stamp facing away from the container,
(b) the release strip has portions extending beyond the stamp at opposite ends thereof and
(c) the adhesive material securing the strip to the container engages with said portions of the strip.

14. In a merchandise package which includes a container, the improvement which comprises:
(a) a coupon validating stamp removably attached to a package containing merchandise,
(b) said stamp comprising a sheet of flexible material and
(c) an activatable adhesive carried on one surface of said stamp and
(d) means removably securing the stamp to the package,
(e) said means including a strip of material releasably engaging with the stamp and
(f) an adhesive bonding portions of said strip to the package.

References Cited in the file of this patent
UNITED STATES PATENTS

| | | |
|---|---|---|
| 223,432 | Brooks | Jan. 13, 1880 |
| 1,497,702 | Stanley | June 17, 1924 |
| 2,148,686 | Durand | Feb. 28, 1939 |
| 2,213,666 | Burke | Sept. 3, 1940 |
| 3,051,371 | Day | Aug. 28, 1962 |

FOREIGN PATENTS

| | | |
|---|---|---|
| 709,750 | Great Britain | June 2, 1954 |